United States Patent
Tamrakar et al.

(10) Patent No.: US 11,323,219 B2
(45) Date of Patent: May 3, 2022

(54) TRIGGERING METHOD AND TRANSMITTING METHOD FOR UPLINK REFERENCE SIGNAL IN COMMUNICATION SYSTEM, APPARATUSES THEREOF, AND STORAGE MEDIUM

(71) Applicant: CHINA ACADEMY OF TELECOMMUNICATIONS TECHNOLOGY, Beijing (CN)

(72) Inventors: Rakesh Tamrakar, Beijing (CN); Runhua Chen, Beijing (CN); Qiubin Gao, Beijing (CN); Hui Li, Beijing (CN); Qiuping Huang, Beijing (CN); Yang Song, Beijing (CN); Chuanjun Li, Beijing (CN); Mengjun Wang, Beijing (CN); Xin Su, Beijing (CN); Yu Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 606 days.

(21) Appl. No.: 16/322,460

(22) PCT Filed: Jul. 18, 2017

(86) PCT No.: PCT/CN2017/093407
§ 371 (c)(1),
(2) Date: Jan. 31, 2019

(87) PCT Pub. No.: WO2018/028396
PCT Pub. Date: Feb. 15, 2018

(65) Prior Publication Data
US 2021/0336734 A1    Oct. 28, 2021

(30) Foreign Application Priority Data
Aug. 12, 2016 (CN) .......................... 201610666157.7

(51) Int. Cl.
*H04L 5/00* (2006.01)
*H04W 72/04* (2009.01)

(52) U.S. Cl.
CPC ....... *H04L 5/0048* (2013.01); *H04W 72/0453* (2013.01)

(58) Field of Classification Search
CPC ....... H04L 5/0048; H04L 1/00; H04L 1/1671; H04L 1/0073; H04W 72/0413; H04W 72/0446; H04W 72/0453
See application file for complete search history.

(56) References Cited

U.S. PATENT DOCUMENTS

2011/0310818 A1  12/2011  Lin et al.
2013/0028138 A1   1/2013  Hao et al.
(Continued)

FOREIGN PATENT DOCUMENTS

CN  101808409 A  8/2010
CN  102469607 A  5/2012
(Continued)

OTHER PUBLICATIONS

Notice of Reasons for Refusal from JP app. No. 2019-507312, dated Dec. 3, 2019, with English translation provided by JPO.
(Continued)

*Primary Examiner* — Dady Chery
(74) *Attorney, Agent, or Firm* — Ladas & Parry, LLP

(57) ABSTRACT

A triggering method and a transmitting method for an uplink reference signal in a communication system, apparatuses thereof, and a storage medium are provided. The communication system includes at least two different signal parameters. The triggering method applied to a network side includes: generating, by the network side, a trigger signaling for triggering a terminal to transmit the uplink reference signal to the network side for one or more times; and
(Continued)

transmitting, by the network side, the trigger signaling to the terminal.

18 Claims, 3 Drawing Sheets

(56) References Cited

U.S. PATENT DOCUMENTS

| | | | |
|---|---|---|---|
| 2013/0058306 A1 | 3/2013 | Noh et al. | |
| 2013/0294400 A1 | 11/2013 | Liu | |
| 2014/0334390 A1 | 11/2014 | Lindholm et al. | |
| 2015/0222402 A1* | 8/2015 | Ouchi | H04W 72/0413 370/329 |
| 2015/0229450 A1 | 8/2015 | Noh | |

FOREIGN PATENT DOCUMENTS

| | | |
|---|---|---|
| CN | 105490791 A | 4/2016 |
| EP | 2542004 A1 | 2/2013 |
| JP | 2013529040 A | 7/2013 |
| JP | 2014506401 A | 3/2014 |
| WO | 2014/109707 A1 | 7/2014 |
| WO | 2015163709 A1 | 10/2015 |
| WO | 2018202014 A1 | 11/2018 |

OTHER PUBLICATIONS

Extended European Search Report from EP app. No. 17838526.6, dated Jun. 17, 2019.
Written Opinion of the International Searching Authority from PCT/CN2017/093407, dated Sep. 27, 2018, with English translation from WIPO.
International Preliminary Report on Patentability from PCT/CN2017/093407, dated Feb. 12, 2019, with English translation from WIPO.
International Search Report for PCT/CN2017/093407 dated Sep. 27, 2017 and its English translation provided by WIPO.
Written Opinion for PCT/CN2017/093407 dated Sep. 27, 2017 and its English translation provided by Google Translate.

* cited by examiner

TRIGGERING METHOD AND TRANSMITTING METHOD FOR UPLINK REFERENCE SIGNAL IN COMMUNICATION SYSTEM, APPARATUSES THEREOF, AND STORAGE MEDIUM

CROSS-REFERENCE TO RELATED APPLICATIONS

This application is the U.S. national phase of PCT Application No. PCT/CN2017/093407 filed on Jul. 18, 2017, which claims the priority to Chinese Patent Application No. 201610666157.7 filed on Aug. 12, 2016, the disclosures of which are hereby incorporated by reference in their entireties.

TECHNICAL FIELD

The present disclosure relates to the field of communication technology, in particular to a triggering method and a transmitting method for an uplink reference signal in a communication system, apparatuses thereof and a storage medium.

BACKGROUND

The subcarrier spacing in an LTE (Long Term Evolution) system is 15 KHz, and each sub-frame (except special sub-frames) includes 14 symbols. The last symbol in an uplink sub-frame can be used to transmit an uplink sounding reference signal (Sounding Reference Symbol, SRS), as shown in FIG. 1, and one or more symbols within an uplink pilot time slot (Uplink Pilot Time Slot, UpPTS) of the special sub-frame can also be used to transmit the SRS, as shown in FIG. 2. A base station triggers a terminal to aperiodically transmit the SRS, that is, the terminal transmits the SRS according to a higher-layer configuration parameter.

However, in a future communication system, there may be multiple basic system parameters in a single system bandwidth, such as multiple subcarrier spacing. Since the basic parameters of different frequency bands in one system bandwidth are different, transmitting schemes of uplink SRS are varied and methods for a network side to trigger the terminal to transmit the SRS are also varied. In this case, it is not suitable to continue to use the method in the LTE system to trigger transmitting of the aperiodic SRS.

SUMMARY

The present disclosure is to provide a triggering method and a transmitting method for an uplink reference signal in a communication system, and apparatuses thereof, which solves the problem that a method for transmitting an uplink reference signal in the related art cannot be applied to the communication system including signals with multiple different signal parameters.

In order to achieve the above objective, a triggering method for an uplink reference signal in a communication system is provided according to an embodiment of the present disclosure, which is applied to a network side. The triggering method includes:

generating, by the network side, a trigger signaling for triggering a terminal to transmit the uplink reference signal to the network side for one or more times; and transmitting, by the network side, the trigger signaling to the terminal.

The communication system includes at least two different signal parameters, and the generating, by the network side, the trigger signaling for triggering the terminal to transmit the reference signal to the network side for one or more times includes:

generating, by the network side, a first trigger signaling for triggering the terminal to transmit the uplink reference signal to the network side in a frequency band corresponding to a preset signal parameter for one or more times; or generating, by the network side, a second trigger signaling for triggering the terminal to transmit the uplink reference signal to the network side in a preset frequency-domain location for one or more times.

The first trigger signaling carries the preset signal parameter; or the second trigger signaling carries the preset frequency-domain location.

Before generating, by the network side, the trigger signaling for triggering the terminal to transmit the uplink reference signal to the network side for one or more times, the triggering method further includes:

transmitting, by the network side, a first higher-layer signaling to the terminal, where the first higher-layer signaling carries the preset signal parameter or the preset frequency-domain location.

In a case that the first trigger signaling is used to trigger the terminal to transmit the uplink reference signal to the network side in the frequency band corresponding to the preset signal parameter for a plurality of times, the triggering method further includes:

transmitting, by the network side, a second higher-layer signaling to the terminal, where the second higher-layer signaling carries a frequency hopping rule for transmitting the uplink reference signal to the network side in the frequency band corresponding to the preset signal parameter for a plurality of times.

The preset signal parameter may include one signal parameter or multiple signal parameters. In a case that the preset signal parameter includes multiple signal parameters, the multiple signal parameters may be the same or different.

The preset frequency-domain location may include one frequency-domain location or multiple frequency-domain locations. In a case that the preset frequency-domain location includes multiple frequency-domain locations, the multiple frequency-domain locations may be the same or different.

Each of the at least two different signal parameters is a subcarrier spacing.

The uplink reference signal is an uplink sounding reference signal.

A transmitting method for an uplink reference signal in a communication system is further provided according to an embodiment of the present disclosure, which is applied to a terminal side. The transmitting method includes:

receiving, by a terminal, a trigger signaling transmitted by a network side; and transmitting, by the terminal, an uplink reference signal to the network side for one or more times in response to the trigger signaling.

The communication system includes at least two different signal parameters, and the transmitting, by the terminal, the uplink reference signal to the network side for one or more times in response to the trigger signaling includes:

transmitting, by the terminal, the uplink reference signal to the network side in a frequency band corresponding to a preset signal parameter for one or more times in response to a first trigger signaling transmitted by the network side; or transmitting, by the terminal, the uplink reference signal to the network side in a preset frequency-domain location for one or more times in response to a second trigger signaling transmitted by the network side.

The first trigger signaling carries the preset signal parameter; or the second trigger signaling carries the preset frequency-domain location.

Before receiving, by a terminal, the trigger signaling transmitted by the network side, the transmitting method further includes:

receiving a first higher-layer signaling transmitted by the network side, where the first higher-layer signaling carries the preset signal parameter or the preset frequency-domain location.

In a case that the first trigger signaling is used to trigger the terminal to transmit the uplink reference signal to the network side in the frequency band corresponding to the preset signal parameter for a plurality of times, the transmitting method further includes:

receiving a second higher-layer signaling transmitted by the network side, where the second higher-layer signaling carries a frequency hopping rule for transmitting the uplink reference signal to the network side in the frequency band corresponding to the preset signal parameter for a plurality of times.

The preset signal parameter may include one signal parameter or multiple signal parameters. In a case that the preset signal parameter includes multiple signal parameters, the multiple signal parameters may be the same or different.

The preset frequency-domain location may be one frequency-domain location or include multiple frequency-domain locations. In a case that the preset frequency-domain location includes multiple frequency-domain locations, the multiple frequency-domain locations may be the same or different.

Each of the at least two different signal parameters is a subcarrier spacing.

The uplink reference signal is an uplink sounding reference signal.

A triggering apparatus for an uplink reference signal in a communication system is further provided according to an embodiment of the present disclosure, which is applied to a network side. The triggering apparatus includes:

a signaling generating module, configured to generate a trigger signaling for triggering a terminal to transmit the uplink reference signal to the network side for one or more times; and a signaling transmitting module, configured to transmit the trigger signaling to the terminal.

The communication system includes at least two different signal parameters, and the signaling generating module includes:

a first signaling generating sub-module, configured to generate a first trigger signaling for triggering the terminal to transmit the uplink reference signal to the network side in a frequency band corresponding to a preset signal parameter for one or more times; and/or a second signaling generating sub-module, configured to generate a second trigger signaling for triggering the terminal to the uplink reference signal to the network side in a preset frequency-domain location for one or more times.

The first trigger signaling carries the preset signal parameter; or the second trigger signaling carries the preset frequency-domain location.

The triggering apparatus further includes: a first higher-layer signaling transmitting module, configured to transmit a first higher-layer signaling to the terminal, where the first higher-layer signaling carries the preset signal parameter or the preset frequency-domain location.

The triggering apparatus further includes: a second higher-layer signaling transmitting module, configured to transmit a second higher-layer signaling to the terminal in a case that the first trigger signaling is used to trigger the terminal to transmit the uplink reference signal to the network side in the frequency band corresponding to the preset signal parameter for a plurality of times, where the second higher-layer signaling carries a frequency hopping rule for transmitting the uplink reference signal to the network side in the frequency band corresponding to the preset signal parameter for a plurality of times.

The preset signal parameter may be one signal parameter or include multiple signal parameters. In a case that the preset signal parameter includes multiple signal parameters, the multiple signal parameters may be the same or different.

The preset frequency-domain location may be one frequency-domain location or include multiple frequency-domain locations.

In a case that the preset frequency-domain location includes multiple frequency-domain locations, the multiple frequency-domain locations may be the same or different.

Each of the at least two different signal parameters is a subcarrier spacing.

The uplink reference signal is an uplink sounding reference signal.

A transmitting apparatus for an uplink reference signal in a communication system is further provided according to an embodiment of the present disclosure, which is applied to a terminal side. The transmitting apparatus includes:

a signaling receiving module, configured to receive a trigger signaling transmitted by a network side; and a signal transmitting module, configured to transmit the uplink reference signal to the network side for one or more times in response to the trigger signaling.

The communication system includes at least two different signal parameters, and the signal transmitting module includes:

a first signal transmitting sub-module, configured to transmit the uplink reference signal to the network side in a frequency band corresponding to a preset signal parameter for one or more times in response to a first trigger signaling transmitted by the network side; and/or a second signal transmitting sub-module, configured to transmit the uplink reference signal to the network side in a preset frequency-domain location for one or more times in response to a second trigger signaling transmitted by the network side.

The first trigger signaling carries the preset signal parameter; or the second trigger signaling carries the preset frequency-domain location.

The transmitting apparatus further includes: a first higher-layer signaling receiving module, configured to receive a first higher-layer signaling transmitted by the network side, where the first higher-layer signaling carries the preset signal parameter or the preset frequency-domain location.

The transmitting apparatus further includes: a second higher-layer signaling receiving module, configured to receive a second higher-layer signaling transmitted by the network side in a case that the first trigger signaling is used to trigger the terminal to transmit the uplink reference signal to the network side in the frequency band corresponding to the preset signal parameter for a plurality of times, where the second higher-layer signaling carries a frequency hopping rule for transmitting the uplink reference signal to the network side in the frequency band corresponding to the preset signal parameter for a plurality of times.

The preset signal parameter may be one signal parameter or include multiple signal parameters. In a case that the preset signal parameter includes multiple signal parameters, the multiple signal parameters may be the same or different.

The preset frequency-domain location may be one frequency-domain location or include multiple frequency-domain locations. In a case that the preset frequency-domain location includes multiple frequency-domain locations, the multiple frequency-domain locations may be the same or different.

Each of the at least two different signal parameters is a subcarrier spacing.

The uplink reference signal is an uplink sounding reference signal.

A triggering apparatus for an uplink reference signal in a communication system is further provided according to an embodiment of the present disclosure, which is applied to a network side. The triggering apparatus includes:

a processor; and a transceiver, configured to receive and transmit data under the control of the processor, where the processor is configured to perform the following operations:

generating a trigger signaling for triggering a terminal to transmit the uplink reference signal to the network side for one or more times; and transmitting the trigger signaling to the terminal.

A transmitting apparatus for an uplink reference signal in a communication system is further provided according to an embodiment of the present disclosure, which is applied to a terminal side, where the transmitting apparatus includes:

a processor; and a transceiver, configured to receive and transmit data under the control of the processor, where the processor is configured to perform the following operations:

receiving a trigger signaling transmitted by a network side; and transmitting an uplink reference signal to the network side for one or more times in response to the trigger signaling.

A nonvolatile computer-readable storage medium is further provided according to an embodiment of the present disclosure, which stores computer-readable instructions executable by a processor. When executing the computer-readable instructions, the processor is configured to perform the following operations:

generating a trigger signaling for triggering a terminal to transmit an uplink reference signal to the network side for one or more times; and transmitting the trigger signaling to the terminal.

A nonvolatile computer-readable storage medium is further provided according to an embodiment of the present disclosure, which stores computer-readable instructions executable by a processor. When executing the computer-readable instructions, the processor is configured to perform the following operations:

receiving a trigger signaling transmitted by a network side; and transmitting an uplink reference signal to the network side for one or more times in response to the trigger signaling.

The above technical solutions according to the present disclosure have at least the following beneficial effects.

In the triggering method and the transmitting method for an uplink reference signal in a communication system and the apparatuses thereof according to the embodiments of the present disclosure, the network side generates a trigger signaling according to the requirements of the communication system and/or the requirements of the terminal, and transmits the trigger signaling to the terminal; after receiving the trigger signaling, the terminal aperiodically transmits the uplink reference signal to the network side for one or more times in response to the trigger signaling, so that the network side can perform uplink channel quality measurement and uplink channel estimation with the uplink reference signal. Based on the triggering method according to the present disclosure, a terminal can be flexibly triggered to transmit the aperiodical uplink reference signals in a communication system including multiple different basic parameters.

DETAILED DESCRIPTION

In order to clarify the technical problem to be solved by the present disclosure, the technical solutions and advantages of the present disclosure, the present disclosure is described in detail hereinafter in conjunction with the appended drawings and some embodiments.

Figure 1:
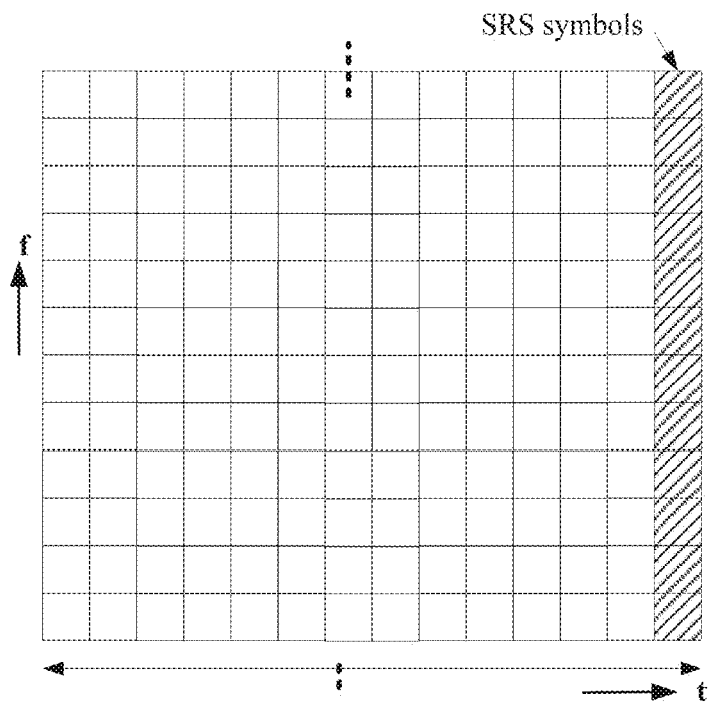
FIG. 1 is a schematic diagram of transmitting an uplink sounding signal in an uplink sub-frame in the related art.
Figure 2:
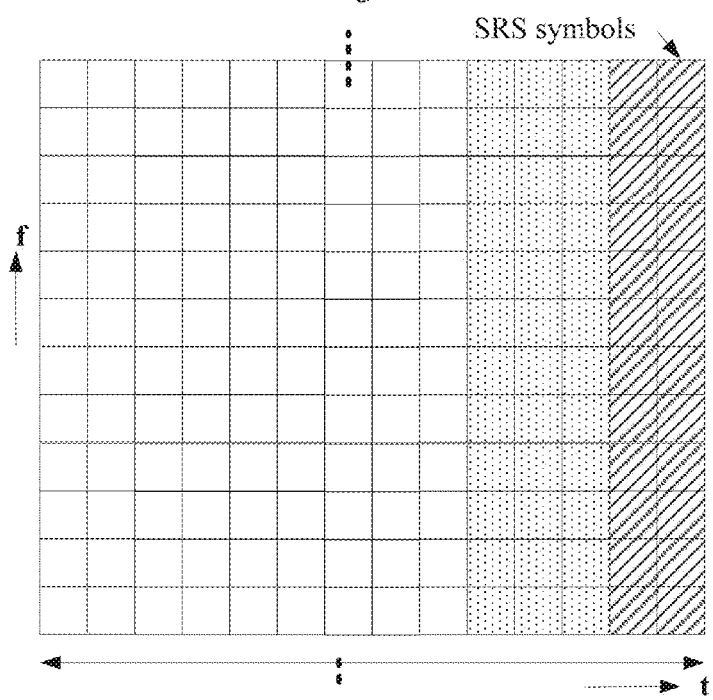
FIG. 2 is a schematic diagram of transmitting an uplink sounding signal in a special sub-frame in the related art.
Figure 3:
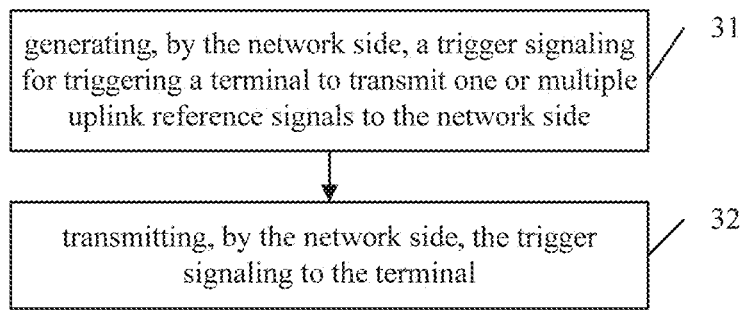
FIG. 3 is a flowchart showing basic steps of a triggering method for an uplink reference signal in a communication system according to an embodiment of the present disclosure.
Figure 4:
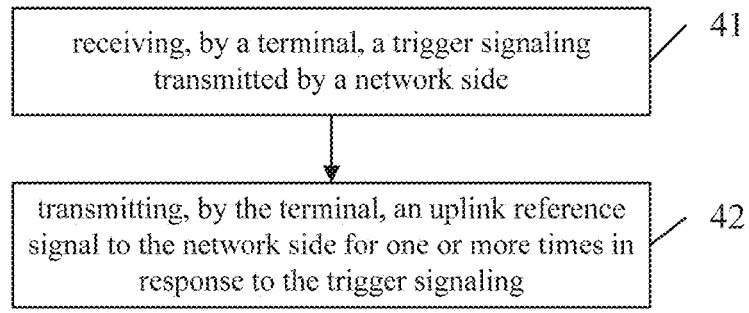
FIG. 4 is a flowchart showing basic steps of a transmitting method for an uplink reference signal in a communication system according to an embodiment of the present disclosure.

As shown in FIG. 3, a triggering method for an uplink reference signal in a communication system, which is applied to a network side, is provided according to an embodiment of the present disclosure. The triggering method includes:

step 31, generating, by the network side, a trigger signaling for triggering a terminal to transmit an uplink reference signal to the network side for one or more times; and step 32, transmitting, by the network side, the trigger signaling to the terminal.

Correspondingly, a transmitting method for an uplink reference signal in a communication system, which is applied to a terminal side, is provided according to an embodiment of the present disclosure, where the communication system includes at least two types of signals with different signal parameters. The transmitting method includes:

step 41, receiving, by a terminal, a trigger signaling transmitted by a network side; and step 42, transmitting, by the terminal, an uplink reference signal to the network side for one or more times in response to the trigger signaling.

Figure 5:
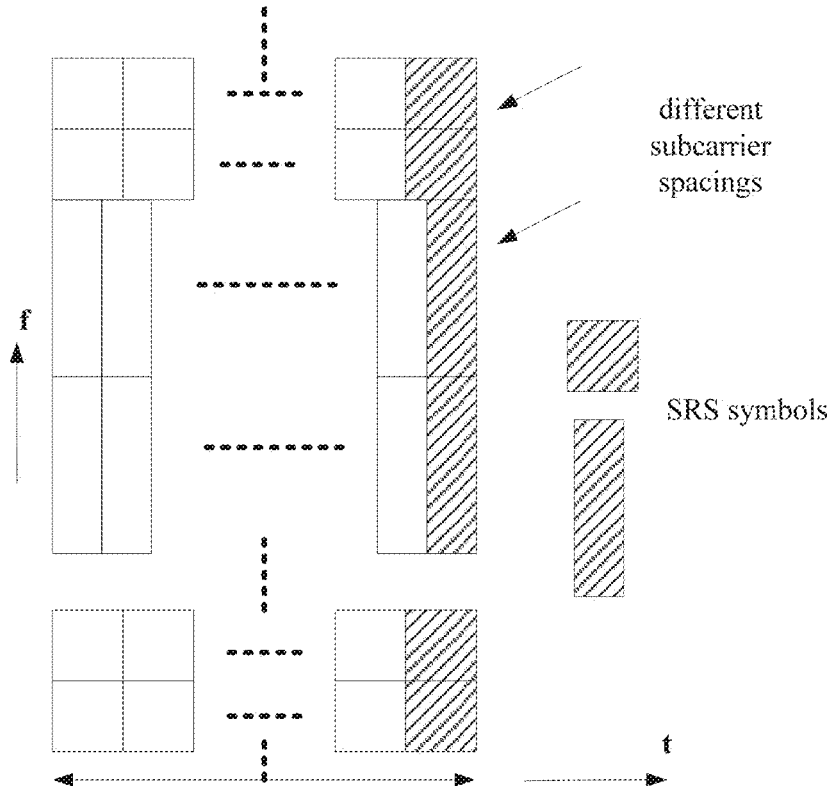
FIG. 5 is schematic diagram of a communication system in which a triggering method for an uplink reference signal in the communication system and a transmitting method for an uplink reference signal in the communication system are applied according to an embodiment of the present disclosure.

The communication system according the above embodiment of the present disclosure includes different signal parameters. As shown in FIG. 5, in the communication system, a subcarrier spacing of some signals is N Hz, and a subcarrier spacing of other signals is M Hz. The signals with different subcarrier spacings are multiplexed in a system bandwidth in the communication system, and symbol lengths for the signals are different due to the different subcarrier spacings.

Specifically, as is similar in the related art, a terminal is provided with one or more symbols in uplink resources to transmit an uplink reference signal. Specifically, as shown in FIG. 5, in the communication system to which the embodiments according to the present disclosure apply, the uplink reference signals have a same subcarrier spacing or different subcarrier spacings in different frequency-domain locations, and the communication system includes one or more continuous subcarriers with the same subcarrier spacing (the communication system in FIG. 5 includes two subcarriers with a same subcarrier spacing).

Specifically, the communication system according to the above embodiment of the present disclosure includes at least two different signal parameters. The at least two different signal parameters are different subcarrier spacings, and the uplink reference signal is an uplink sounding reference signal.

It should be noted that the trigger signaling transmitted by the network side according to the above embodiment of the present disclosure can trigger the terminal to transmit the uplink reference signal for one time, or trigger the terminal to transmit the uplink reference signal for multiple times. For purpose of clearer description, the method according to the present disclosure is detailed in scenarios where the terminal is triggered to transmit the uplink reference signal for one time or multiple times respectively.

In the first scenario, the trigger signaling transmitted by the network side is used to trigger the terminal to transmit the uplink reference signal for one time. It should be noted that the network side may perform the triggering in two manners in the first scenario, which includes a first triggering manner and a second triggering manner.

First Triggering Manner

According to the embodiment of the present disclosure, step 31 of the triggering method includes: step 311, generating, by the network side, a first trigger signaling for triggering the terminal to transmit the uplink reference signal to the network side for one time in a frequency band corresponding to a preset signal parameter.

Correspondingly, step 42 of the transmitting method according the embodiment of the present disclosure includes: step 421, transmitting, by the terminal, the uplink reference signal to the network side for one time in the frequency band corresponding to the preset signal parameter in response to the first trigger signaling transmitted by the network side.

In the first triggering manner, the preset signal parameter is one signal parameter.

The preset signal parameter may be a default signal parameter, that is, both the network side and the terminal side are aware of what the preset signal parameter is in advance. The terminal may be aware of which signal parameter is used for transmitting the uplink reference signal, without requiring the network side to notify the terminal.

Optionally, the preset signal parameter is preset by the network side and is notified to the terminal via a higher-layer signaling in advance, and the triggering method according to an embodiment of the present disclosure further includes: step 33, transmitting, by the network side, a first higher-layer signaling to the terminal, where the first higher-layer signaling carries the preset signal parameter.

Correspondingly, the transmitting method according to an embodiment of the present disclosure further includes: step 43, receiving the first higher-layer signaling transmitted by the network side, where the first higher-layer signaling carries the preset signal parameter.

In this way, the length of the trigger signaling can be reduced, because it is not required to notify the terminal of a signal parameter or a frequency-domain location for transmitting an uplink reference signal each time when transmitting the trigger signaling, which avoids a waste of resources and saves the bandwidth. In addition, in this manner, the network side cannot dynamically trigger uplink reference signals with different signal parameters, that is, the uplink reference signal is transmitted each time based on the signal parameter preset by the network side.

Optionally, the terminal is notified of the preset signal parameter by the network side via the trigger signaling, that is, the first trigger signaling carries the preset signal parameter.

In this way, the trigger signaling requires to carry a signal parameter each time when the network side transmits the trigger signaling, and the terminal transmits an uplink reference signal based on the signal parameter carried in the trigger signaling after receiving the trigger signaling.

It should be noted that, since the trigger signaling requires to carry a signal parameter each time when the network side transmits the trigger signaling in this way, and different trigger signalings may carry a same signal parameter or different signal parameters, the network side is capable of dynamically triggering uplink reference signals having different signal parameters. For example, an uplink reference signal based on a signal parameter (for instance, based on a subcarrier spacing) is triggered in a previous Transmission Time Interval TTI (or a sub-frame), while the uplink reference signal based on another signal parameter is triggered in one or several TTIs (or sub-frames) subsequent to the previous TTI or sub-frame. In this manner, the triggering can be flexible and real-time, as the network side can adjust the signal parameter or frequency-domain location for transmitting an uplink reference signal according to real-time requirements of the communication system and/or the terminal.

Second Triggering Manner

Step 31 of the triggering method according to an embodiment of the present disclosure includes: step 312, generating, by the network side, a second trigger signaling for triggering the terminal to transmit the uplink reference signal to the network side in a preset frequency-domain location for one time.

Correspondingly, step 42 of the transmitting method according to an embodiment of the present disclosure includes: step 422, transmitting, by the terminal, the uplink reference signal to the network side in the preset frequency-domain location for one time in response to the second trigger signaling transmitted by the network side.

In the second triggering manner, the preset frequency-domain location is one frequency-domain location.

The preset frequency-domain location may be a default frequency-domain location, that is, both the network side and the terminal side are aware of where the preset frequency-domain location is in advance. The terminal can be aware of in which frequency-domain location the uplink reference signal is to be sent, without requiring the network side to notify the terminal.

Optionally, the preset frequency-domain location is preset by the network side and is notified to the terminal in advance via a higher-layer signaling, and the triggering method according to an embodiment of the present disclosure further includes: step 33, transmitting, by the network side, a first higher-layer signaling to the terminal, where the first higher-layer signaling carries the preset frequency-domain location.

Correspondingly, the transmitting method according to an embodiment of the present disclosure further includes: step 43, receiving the first higher-layer signaling transmitted by the network side, where the first higher-layer signaling carries the preset frequency-domain location.

In this manner, the length of the trigger signaling can be reduced, because there is no need to notify the terminal of a frequency-domain location for transmitting an uplink reference signal in each trigger signaling, which avoids a waste of resources and saves the bandwidth. Besides, in this manner, the network side cannot dynamically trigger uplink reference signals with different frequency-domain locations, that is, the uplink reference signal is transmitted each time based on the frequency-domain location preset by the network side.

Optionally, the terminal is notified of the preset frequency-domain location by the network side via the trigger signaling, that is, the second trigger signaling carries the preset frequency-domain location.

In this manner, the trigger signaling needs to carry a frequency-domain location each time when the network side transmits the trigger signaling, and the terminal transmits an uplink reference signal based on the frequency-domain location carried in the trigger signaling after receiving the trigger signaling.

It should be noted that different trigger signalings may carry identical or different frequency-domain locations, as in this manner, the trigger signaling needs to carry a frequency-domain location each time when the network side transmits the trigger signaling. Thus, in this manner, the network side is capable of dynamically triggering uplink reference signals with different frequency-domain locations, for example, an uplink reference signal (for instance, a subcarrier spacing) is triggered based on a frequency-domain location in a previous TTI (or a sub-frame), while the uplink reference signal is triggered based on another frequency-domain location in one or several TTIs (or sub-frames) subsequent to the previous TTI or sub-frame. In this manner, the triggering can be flexible and real-time, as the network side can adjust the frequency-domain locations for transmitting an uplink reference signal according to real-time requirements of the communication system and/or the terminal.

In the second scenario, the trigger signaling transmitted by the network side is used to trigger the terminal to transmit the uplink reference signal for multiple times. It should be noted that the network side may perform the triggering in the following two manners in the second scenario, which includes a third triggering manner and a fourth triggering manner.

Third Triggering Manner

Step 31 of the triggering method according to an embodiment of the present disclosure includes: step 313, generating, by the network side, a first trigger signaling for triggering the terminal to transmit the uplink reference signal to the network side in a frequency band corresponding to a preset signal parameter for multiple times.

Correspondingly, step 42 of the transmitting method according an embodiment of the present disclosure includes: step 423, transmitting, by the terminal, the uplink reference signal to the network side in the frequency band corresponding to the preset signal parameter for multiple times in response to the first trigger signaling transmitted by the network side.

In the third triggering manner, the preset signal parameter may be one signal parameter or include multiple signal parameters. In a case that the preset signal parameter includes multiple signal parameters, the multiple signal parameters may be multiple identical signal parameters or multiple different signal parameters. It should be noted that, when transmitting an uplink reference signal in a frequency band corresponding to one signal parameter for multiple times, the uplink reference signal requires to be transmitted for the multiple times in different sub-bands. Multiple uplink reference signals may be transmitted simultaneously or not, which is not limited herein.

The preset signal parameter may be a default signal parameter, that is, both the network side and the terminal side are, in advance, aware of what the preset signal parameter is. The terminal can be aware of which signal parameter is to be used for transmitting the uplink reference signals, without requiring the network side to notify the terminal. The network side transmits the first trigger signaling to the terminal, and the terminal, upon receipt of the first trigger signaling, transmits the uplink reference signals in different sub-bands of the frequency band corresponding to the one signal parameter for multiple times or in frequency bands corresponding to the multiple signal parameters for multiple times. Specifically, regarding the different sub-bands for transmitting the uplink reference signals for multiple times, the terminal may randomly determine the sub-bands from the frequency band corresponding to the preset signal parameter, or transmits the uplink reference signals in pre-defined sub-bands, which is not limited herein.

Optionally, the preset signal parameter is preset by the network side and is notified to the terminal in advance via a higher-layer signaling, and the triggering method according to an embodiment of the present disclosure further includes: step 33, transmitting, by the network side, a first higher-layer signaling to the terminal, where the first higher-layer signaling carries the preset signal parameter.

Since the first trigger signaling is adopted to trigger the terminal to transmit the uplink reference signal in the frequency band corresponding to the preset signal parameter for multiple times, the triggering method according to an embodiment of the present disclosure further includes: step 34, transmitting, by the network side, a second higher-layer signaling to the terminal, where the second higher-layer signaling carries a frequency hopping rule for transmitting the uplink reference signal to the network side in the frequency band corresponding to the preset signal parameter for multiple times.

Correspondingly, the transmitting method according to an embodiment of the present disclosure further includes: step 44, receiving the second higher-layer signaling transmitted by the network side, where the second higher-layer signaling carries the frequency hopping rule for transmitting the uplink reference signal to the network side in the frequency band corresponding to the preset signal parameter for multiple times.

It should be noted that, the network side not only notifies the terminal of the signal parameter or a frequency-domain location via a higher-layer signaling, but also needs to notify the terminal of the hopping rule for transmitting the uplink reference signal via a higher-layer signaling for multiple times, as in this manner the terminal transmits the uplink reference signal to the network side for multiple times. For example, when the terminal transmits the uplink reference signal for multiple times, the uplink sounding signal is only allowed to be transmitted many times in a frequency band corresponding to one signal parameter, or the uplink sounding signal may be allowed to be transmitted many times in frequency bands corresponding to different signal parameters, which is not limited herein.

In this manner, the length of the trigger signaling can be reduced, because there is no need to notify the terminal of a signal parameter or a frequency-domain location for transmitting uplink reference signals in each trigger signaling, which avoids a waste of resources and saves the bandwidth. Besides, in this manner, the network side cannot dynamically trigger uplink reference signals with different signal parameters, that is, the uplink reference signals are transmitted each time based on the signal parameter preset by the network side.

Optionally, the terminal is notified of the preset signal parameter by the network side via the trigger signaling, that is, the first trigger signaling carries the preset signal parameter.

In this manner, the trigger signaling needs to carry a signal parameter each time when the network side transmits the trigger signaling, and the terminal transmits uplink reference signals based on the signal parameter carried in the trigger signaling after receiving the trigger signaling.

It should be noted that different trigger signalings may carry identical or different signal parameters, as in this manner the trigger signaling needs to carry a signal parameter each time when the network side transmits the trigger signaling. Therefore, in this manner, the network side is capable of dynamically triggering uplink reference signals with different signal parameters, for example, an uplink reference signal based on a signal parameter (for instance, a subcarrier spacing) is transmitted in a previous TTI (or a sub-frame), while the uplink reference signal based on another signal parameter is transmitted in one or several TTIs (or sub-frames) subsequent to the previous TTI or sub-frame. In this manner, the triggering can be flexible and real-time, as the network side can adjust the signal parameter or frequency-domain location for transmitting an uplink reference signal according to real-time requirements of the communication system and/or the terminal.

Fourth Triggering Manner

Step 31 of the triggering method according to an embodiment of the present disclosure includes: step 314, generating, by the network side, a second trigger signaling for triggering the terminal to transmit the uplink reference signal to the network side in a preset frequency-domain location for multiple times.

Correspondingly, step 42 of the transmitting method according to an embodiment of the present disclosure includes: step 424, transmitting, by the terminal, the uplink reference signal to the network side in the preset frequency-domain location in response to the second trigger signaling transmitted by the network side for multiple times.

In the fourth triggering manner, the preset frequency-domain location may include multiple identical or different frequency-domain locations, and the multiple uplink reference signals may be transmitted simultaneously or not, which are not limited herein.

The preset frequency-domain location may be a default frequency-domain location, that is, both the network side and the terminal side are aware of where the preset frequency-domain location is in advance. The terminal can be aware of in which frequency-domain location the uplink reference signal is to be sent, without requiring the network side to notify the terminal.

Optionally, the preset frequency-domain location is preset by the network side and is notified to the terminal via a higher-layer signaling, and the triggering method according to an embodiment of the present disclosure further includes: step 33, transmitting, by the network side, a first higher-layer signaling to the terminal, where the first higher-layer signaling carries the preset frequency-domain location.

Correspondingly, the transmitting method according to an embodiment of the present disclosure further includes: step 43, receiving the first higher-layer signaling transmitted by the network side, where the first higher-layer signaling carries the preset frequency-domain location.

In this manner, the length of the trigger signaling can be reduced, because it is not required to notify the terminal of the frequency-domain location for transmitting the uplink reference signal each time in the trigger signaling, which avoids a waste of resources and saves the bandwidth. Besides, in this manner, the network side cannot dynamically trigger uplink reference signals with different frequency-domain locations, that is, the uplink reference signals are transmitted each time based on frequency-domain locations preset by the network side.

Optionally, the terminal is notified of the preset frequency-domain location by the network side via the trigger signaling, that is, the second trigger signaling carries the preset frequency-domain location.

In this manner, the trigger signaling needs to carry frequency-domain locations each time when the network side transmits the trigger signaling, and the terminal transmits uplink reference signals based on the frequency-domain locations carried in the trigger signaling after receiving the trigger signaling.

It should be noted that different trigger signalings may carry identical or different frequency-domain locations, as in this manner the trigger signaling needs to carry frequency-domain locations each time when the network side transmits the trigger signaling. Thus, in this manner, the network side is capable of dynamically triggering uplink reference signals with different frequency-domain locations. For example, an uplink sounding signal is transmitted in a frequency-domain location (such as a sub-carrier spacing) in a previous TTI (or a sub-frame), while the uplink sounding signal is transmitted in another frequency-domain location in one or several TTIs (or sub-frames) after the previous TTI (or the sub-frame). In this manner, the triggering can be flexible and real-time, as the network side can adjust the frequency-domain location for transmitting an uplink reference signal according to real-time requirements of the communication system and/or the terminal.

As described above, based on the methods according to the embodiments of the present disclosure, a network side can flexibly trigger a terminal to transmit aperiodical uplink sounding signals in a future communication system including multiple different basic parameters. The network side can generate a trigger signaling according to requirements of the communication system and/or the terminal and transmit the same to the terminal. After receiving the trigger signaling, the terminal aperiodically transmits the uplink reference signals to the network side for one or more times in response to the trigger signaling, so that the network side can perform uplink channel quality measurement and uplink channel estimation with the uplink reference signals. Based on the triggering methods according to the present disclosure, a terminal can be flexibly triggered to aperiodically transmit uplink reference signals in a communication system including multiple different basic parameters.

Figure 6:
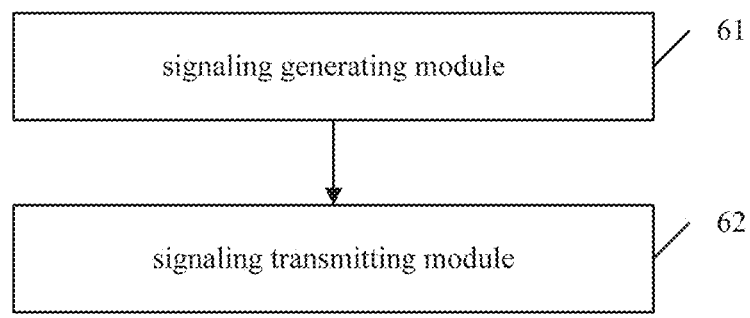
FIG. 6 is a schematic structural diagram of a triggering apparatus for an uplink reference signal in a communication system according to an embodiment of the present disclosure.

To better achieve the above objective, a triggering apparatus for an uplink reference signal in a communication system is provided according to an embodiment of the present disclosure, as shown in FIG. 6, which is applied to a network side. The triggering apparatus includes:

a signaling generating module 61, configured to generate a trigger signaling for triggering a terminal to transmit the uplink reference signal to the network side for one or more times; and a signaling transmitting module 62, configured to transmit the trigger signaling to the terminal.

Specifically, in an embodiment according to the present disclosure, the communication system includes at least two different signal parameters, and the signaling generating module includes:

a first signaling generating sub-module, configured to generate a first trigger signaling for triggering the terminal to transmit the uplink reference signal to the network side in a frequency band corresponding to a preset signal parameter for one or more times; and/or a second signaling generating sub-module, configured to generate a second trigger signaling for triggering the terminal to transmit the uplink reference signal to the network side in a preset frequency-domain location for one or more times.

Specifically, in an embodiment according to the present disclosure, the first trigger signaling carries the preset signal parameter; or the second trigger signaling carries the preset frequency-domain location.

Specifically, in an embodiment according to the present disclosure, the triggering apparatus further includes: a first higher-layer signaling transmitting module, configured to transmit a first higher-layer signaling to the terminal, where the first higher-layer signaling carries the preset signal parameter or the preset frequency-domain location.

Specifically, in an embodiment according to the present disclosure, the triggering apparatus further includes: a second higher-layer signaling transmitting module, configured to transmit a second higher-layer signaling to the terminal in a case that the first trigger signaling is used to trigger the terminal to transmit the uplink reference signal to the network side in the frequency band corresponding to the preset signal parameter for multiple times, where the second higher-layer signaling carries a frequency hopping rule for transmitting the uplink reference signal to the network side in the frequency band corresponding to the preset signal parameter for multiple times.

Specifically, in an embodiment according to the present disclosure, the preset signal parameter may be one signal parameter or include multiple signal parameters. In a case that the preset signal parameter includes multiple signal parameters, the multiple signal parameters may be the same or different Specifically, in an embodiment according to the present disclosure, the preset frequency-domain location may be one frequency-domain location or include multiple frequency-domain locations. In a case that the preset frequency-domain location includes multiple frequency-domain locations, the multiple frequency-domain locations may be the same or different.

Specifically, in an embodiment according to the present disclosure, the at least two different signal parameters are different subcarrier spacings.

Specifically, in an embodiment according to the present disclosure, the uplink reference signal is an uplink sounding reference signal.

It should be noted that the triggering apparatus for an uplink reference signal in a communication system according to the above embodiments of the present disclosure is an apparatus to which the triggering method for an uplink reference signal in a communication system according to the aforementioned embodiments of the present disclosure is applied. Therefore, all the aforementioned embodiments about the triggering method for an uplink reference signal in a communication system are applicable to the triggering apparatus, which can achieve the same or similar beneficial effects.

Figure 7:
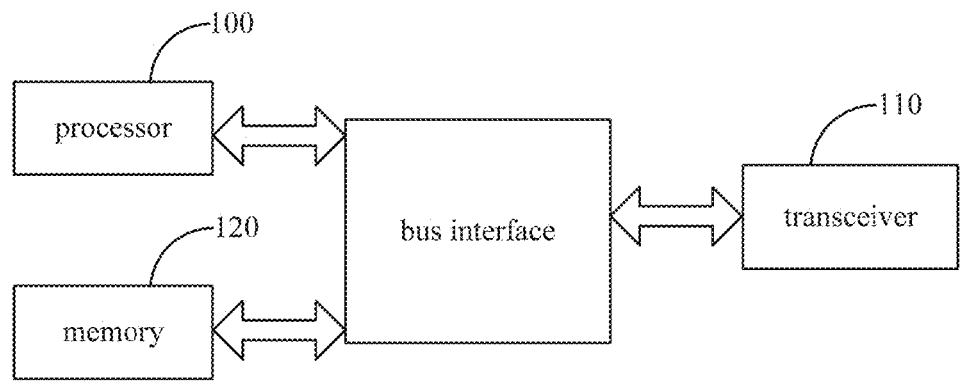
FIG. 7 is a schematic structural diagram of a triggering apparatus for an uplink reference signal in a communication system or a transmitting apparatus for an uplink reference signal in a communication system according to an embodiment of the present disclosure.

To better achieve the above objective, a triggering apparatus for an uplink reference signal in a communication system is further provided according to an embodiment of the present disclosure, as shown in FIG. 7. The triggering apparatus includes a processor 100, a memory 120 connected to the processor 100 through a bus interface, and a transceiver 110 connected to the processor 100 through the bus interface. The memory is configured to store programs and data that the processor uses when performing operations. The transceiver 110 is configured to transmit a trigger signaling. The triggering apparatus implements the following functional modules when the processor invokes and executes the programs and data stored in the memory:

a signaling generating module, configured to generate a trigger signaling for triggering a terminal to transmit an uplink reference signal to a network side for one or more times; and a signaling transmitting module, configured to transmit the trigger signaling to the terminal.

The bus architecture in FIG. 7 may include any number of interconnected buses and bridges, which links various circuits such as one or multiple processors represented by the processor 100 and memories represented by the memory 120. The bus architecture can also link other circuit components such as an external device, a voltage stabilizer and a power management circuit, which is common knowledge in the art and therefore is not described in further detail. The bus interface provides interfaces. The transceiver 110 may include multiple components, namely a transmitter and a receiver, which provides means for communication with other apparatuses on a transmission medium. The processor 100 is responsible for management of the bus architecture and general processing, and the memory 120 may store the data used by the processor 100 in performing operations.

The processor 100 performs management of the bus architecture and general processing, and the memory 120 may store the data for the operations of processor 100.

It should be noted that the triggering apparatus for an uplink reference signal in a communication system according to this embodiment of the present disclosure is a physical apparatus corresponding to the triggering apparatus for an uplink reference signal in a communication system according to the aforementioned embodiments. Therefore, all the aforementioned embodiments about the triggering method for an uplink reference signal in a communication system are applicable to the triggering apparatus, which can achieve the same or similar beneficial effects.

Figure 8:
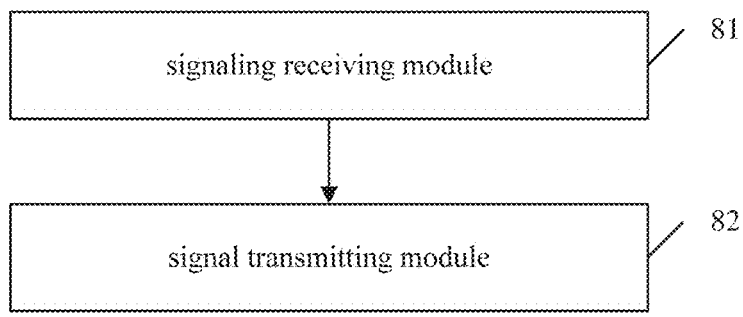
FIG. 8 is a schematic structural diagram of a transmitting apparatus for an uplink reference signal in a communication system according to an embodiment of the present disclosure.

As shown in FIG. 8, a transmitting apparatus for an uplink reference signal in a communication system is further provided according to an embodiment of the present disclosure, where the communication system includes at least two types of signals with different signal parameters. The transmitting apparatus includes:

a signaling receiving module 81, configured to receive a trigger signaling transmitted by a network side; and a signal transmitting module 82, configured to transmit the uplink reference signal to the network side for one or more times in response to the trigger signaling.

Specifically, in an embodiment according to the present disclosure, the communication system includes at least two different signal parameters, and the signal transmitting module includes:

a first signaling transmitting sub-module, configured to transmit the uplink reference signal to the network side in a frequency band corresponding to a preset signal parameter for one or more times in response to a first trigger signaling transmitted by the network side; and/or a second signal transmitting sub-module, configured to transmit the uplink reference signal to the network side in a preset frequency-domain location for one or more times in response to a second trigger signaling transmitted by the network side.

Specifically, in an embodiment according to the present disclosure, the first trigger signaling carries the preset signal parameter; or the second trigger signaling carries the preset frequency-domain location.

Specifically, in an embodiment according to the present disclosure, the transmitting apparatus further includes: a first higher-layer signaling receiving module, configured to receive a first higher-layer signaling transmitted by the network side, where the first higher-layer signaling carries the preset signal parameter or the preset frequency-domain location.

Specifically, in an embodiment according to the present disclosure, the transmitting apparatus further includes: a second higher-layer signaling receiving module, configured to receive a second higher-layer signaling transmitted by the network side in a case that the first trigger signaling is used to trigger the terminal to transmit the uplink reference signal to the network side in the frequency band corresponding to the preset signal parameter for multiple times, where the second higher-layer signaling carries a frequency hopping rule for transmitting the uplink reference signal to the network side in the frequency band corresponding to the preset signal parameter for multiple times.

Specifically, in an embodiment according to the present disclosure, the preset signal parameter may be one signal parameter or include multiple signal parameters. In a case that the preset signal parameter includes multiple signal parameters, the multiple signal parameters may be multiple identical signal parameters or multiple different signal parameters.

Specifically, in an embodiment according to the present disclosure, the preset frequency-domain location may be one frequency-domain location or include multiple frequency-domain locations. In a case that the preset frequency-domain location, includes multiple frequency-domain locations, the multiple frequency-domain locations may be multiple identical frequency-domain locations or multiple different frequency-domain locations.

Specifically, in an embodiment according to the present disclosure, the at least two different signal parameters are different subcarrier spacings.

Specifically, in an embodiment according to the present disclosure, the uplink reference signal is an uplink sounding reference signal.

As described above, with the apparatuses according to the embodiments of the present disclosure, a network side can flexibly trigger a terminal to transmit aperiodical uplink sounding signals in a future communication system including multiple different basic parameters. The network side can generate a trigger signaling according to requirements of the communication system and/or the terminal and transmit the same to the terminal. After receiving the trigger signaling, the terminal aperiodically transmits the uplink reference signal to the network side for one or more times in response to the trigger signaling, so that the network side can perform uplink channel quality measurement and uplink channel estimation with the uplink reference signal. By the transmitting method according to the present disclosure, a terminal can be flexibly triggered to aperiodically transmit uplink reference signals in a communication system including multiple different basic parameters.

It should be noted that the transmitting apparatus for an uplink reference signal in a communication system according to the above embodiments of the present disclosure is an apparatus to which the transmitting method for an uplink reference signal in a communication system according to the aforementioned embodiments of the present disclosure is applied. Therefore, all the aforementioned embodiments about the transmitting method for an uplink reference signal in a communication system are applicable to the transmitting apparatus, which can achieve the same or similar beneficial effects.

To better achieve the above objective, a transmitting apparatus for an uplink reference signal in a communication system is further provided according to an embodiment of the present disclosure, as shown in FIG. 7. The transmitting apparatus includes a processor 100, a memory 120 connected to the processor 100 through a bus interface, and a transceiver 110 connected to the processor 100 through the bus interface. The memory is configured to store programs and data that the processor uses when performing operations. The transceiver 110 is configured to transmit a trigger signaling. The transmitting apparatus implements the following functional modules when the processor invokes and executes the programs and data stored in the memory:

a signaling receiving module, configured to receive a trigger signaling transmitted by a network side; and a signal transmitting module, configured to transmit an uplink reference signal to the network side for one or more times in response to the trigger signaling.

The bus architecture in FIG. 7 may include any number of interconnected buses and bridges, which links various circuit components together such as one or multiple processors represented by the processor 100 and memories represented by the memory 120. The bus architecture can also link other circuit components such as an external device, a voltage stabilizer and a power management circuit, which is common knowledge in the art and therefore is not described in further detail. The bus interface provides interfaces. The transceiver 110 may include multiple components, namely a transmitter and a receiver, which provides means for communication with other apparatuses through a transmission medium. The processor 100 is responsible for management of the bus architecture and general processing, and the memory 120 may store the data used by the processor 100 in performing operations.

The processor 100 performs management of the bus architecture and general processing, and the memory 120 may store the data used by the processor 100 in performing operations.

It should be noted that the transmitting apparatus for an uplink reference signal in a communication system according to this embodiment of the present disclosure is a physical apparatus corresponding to the transmitting apparatus for an uplink reference signal in a communication system according to the aforementioned embodiments. Therefore, all the aforementioned embodiments about the transmitting method for an uplink reference signal in a communication system are applicable to the transmitting apparatus in this embodiment, and all the embodiments can achieve the same or similar beneficial effects.

The above described embodiments are only some optional embodiments of the present disclosure. It should be noted that numerous improvements and modifications can be made by those of ordinary skill in the art without deviating from the essence of the present disclosure, and all the improvements and modifications shall fall within the scope of the present disclosure.

What is claimed is:

1. A triggering method for an uplink reference signal in a communication system, applied to a network side, comprising:
    generating, by the network side, a trigger signaling for triggering a terminal to transmit the uplink reference signal to the network side for one or more times; and
    transmitting, by the network side, the trigger signaling to the terminal;
    wherein the communication system comprises at least two different signal parameters, and the generating, by the network side, the trigger signaling for triggering the terminal to transmit the uplink reference signal to the network side for one or more times comprises:
    generating, by the network side, a first trigger signaling for triggering the terminal to transmit the uplink reference signal to the network side in a frequency band corresponding to a preset signal parameter of the at least two different signal parameters for one or more times; or
    generating, by the network side, a second trigger signaling for triggering the terminal to transmit the uplink reference signal to the network side in a preset frequency-domain location for one or more times.

2. The triggering method according to claim 1, wherein the first trigger signaling carries the preset signal parameter; or
    the second trigger signaling carries the preset frequency-domain location.

3. The triggering method according to claim 1, wherein before generating, by the network side, the trigger signaling for triggering the terminal to transmit the uplink reference signal to the network side for one or more times, the triggering method further comprises:
    transmitting, by the network side, a first higher-layer signaling to the terminal, wherein the first higher-layer signaling carries the preset signal parameter or the preset frequency-domain location.

4. The triggering method according to claim 3, wherein in a case that the first trigger signaling is used to trigger the terminal to transmit the uplink reference signal to the network side in the frequency band corresponding to the preset signal parameter for a plurality of times, the triggering method further comprises:
    transmitting, by the network side, a second higher-layer signaling to the terminal, wherein the second higher-layer signaling carries a frequency hopping rule for transmitting the uplink reference signal to the network side in the frequency band corresponding to the preset signal parameter for a plurality of times.

5. The triggering method according to claim 1, wherein the preset signal parameter comprises one signal parameter or a plurality of signal parameters; and
    in a case that the preset signal parameter comprises a plurality of signal parameters, the signal parameters are the same or different; or
    wherein the preset frequency-domain location comprises one frequency-domain location or a plurality of frequency-domain locations; and
    in a case that the preset frequency-domain location comprises a plurality of frequency-domain locations, the frequency-domain locations are the same or different.

6. The triggering method according to claim 1, wherein each of the at least two different signal parameters is a subcarrier spacing; and
    wherein the uplink reference signal is an uplink sounding reference signal.

7. A transmitting method for an uplink reference signal in a communication system, applied to a terminal side, comprising:
    receiving, by a terminal, a trigger signaling transmitted by a network side; and
    transmitting, by the terminal, the uplink reference signal to the network side for one or more times in response to the trigger signaling;
    wherein the communication system comprises at least two different signal parameters, and the transmitting, by the terminal, the uplink reference signal to the network side for one or more times in response to the trigger signaling comprises:
    transmitting, by the terminal, the uplink reference signal to the network side in a frequency band corresponding to a preset signal parameter of the at least two different signal parameters for one or more times in response to a first trigger signaling transmitted by the network side; or
    transmitting, by the terminal, the uplink reference signal to the network side in a preset frequency-domain location for one or more times in response to a second trigger signaling transmitted by the network side.

8. The transmitting method according to claim 7, wherein the first trigger signaling carries the preset signal parameter; or
    the second trigger signaling carries the preset frequency-domain location.

9. The transmitting method according to claim 7, wherein before receiving, by the terminal, the trigger signaling transmitted by the network side, the transmitting method further comprises:
    receiving a first higher-layer signaling transmitted by the network side, wherein the first higher-layer signaling carries the preset signal parameter or the preset frequency-domain location.

10. The transmitting method according to claim 9, wherein in a case that the first trigger signaling is used to trigger the terminal to transmit the uplink reference signal to the network side in the frequency band corresponding to the preset signal parameter for a plurality of times, the transmitting method further comprises:
receiving a second higher-layer signaling transmitted by the network side, wherein the second higher-layer signaling carries a frequency hopping rule for transmitting the uplink reference signal to the network side in the frequency band corresponding to the preset signal parameter for a plurality of times.

11. The transmitting method according to claim 7, wherein the preset signal parameter comprises one signal parameter or a plurality of signal parameters; and
in a case that the preset signal parameter comprises a plurality of signal parameters, the signal parameters are the same or different; or
wherein the preset frequency-domain location comprises one frequency-domain location or a plurality of frequency-domain locations; and
in a case that the preset frequency-domain location comprises a plurality of frequency-domain locations, the frequency-domain locations are the same or different.

12. The transmitting method according to claim 7, wherein each of the at least two different signal parameters is a subcarrier spacing; and
wherein the uplink reference signal is an uplink sounding reference signal.

13. A transmitting apparatus for an uplink reference signal in a communication system, applied to a terminal side, comprising:
a processor;
a memory storing computer-readable instructions executable by a processor; and
a transceiver, configured to receive and transmit data under the control of the processor,
wherein when executing the computer-readable instructions, the processor is configured to perform steps of the transmitting method for an uplink reference signal in a communication system according to claim 7.

14. The transmitting apparatus according to claim 13, wherein the first trigger signaling carries the preset signal parameter; or the second trigger signaling carries the preset frequency-domain location.

15. The transmitting apparatus according to claim 13, wherein the processor is further configured to: receive a first higher-layer signaling transmitted by the network side, wherein the first higher-layer signaling carries the preset signal parameter or the preset frequency-domain location; and wherein the processor is further configured to:
a second higher-layer signaling receiving module, configured to receive a second higher-layer signaling transmitted by the network side in a case that the first trigger signaling is used to trigger the terminal to transmit the uplink reference signal to the network side in the frequency band corresponding to the preset signal parameter for a plurality of times, wherein the second higher-layer signaling carries a frequency hopping rule for transmitting the uplink reference signal to the network side in the frequency band corresponding to the preset signal parameter for a plurality of times; and
wherein the preset signal parameter comprises one signal parameter or a plurality of signal parameters, and in a case that the preset signal parameter comprises a plurality of signal parameters, the signal parameters are the same or different; or the preset frequency-domain location comprises one frequency-domain location or a plurality of frequency-domain locations, and in a case that the preset frequency-domain location comprises a plurality of frequency-domain locations, the frequency-domain locations are the same or different;
and wherein each of the at least two different signal parameters is a subcarrier spacing, and, and the uplink reference signal is an uplink sounding reference signal.

16. A triggering apparatus for an uplink reference signal in a communication system, applied to a network side, comprising:
a processor;
a memory storing computer-readable instructions executable by a processor; and
a transceiver, configured to receive and transmit data under the control of the processor,
wherein when executing the computer-readable instructions, the processor is configured to:
generate a trigger signaling for triggering a terminal to transmit the uplink reference signal to the network side for one or more times; and
transmit the trigger signaling to the terminal;
wherein the communication system comprises at least two different signal parameters, and the processor is further configured to:
generate a first trigger signaling for triggering the terminal to transmit the uplink reference signal to the network side in a frequency band corresponding to a preset signal parameter of the at least two different signal parameters for one or more times; and/or
generate a second trigger signaling for triggering the terminal to transmit the uplink reference signal to the network side in a preset frequency-domain location for one or more times.

17. The triggering apparatus according to claim 16, wherein the first trigger signaling carries the preset signal parameter; or the second trigger signaling carries the preset frequency-domain location.

18. The triggering apparatus according to claim 16, wherein the processor is further configured to: transmit a first higher-layer signaling to the terminal, wherein the first higher-layer signaling carries the preset signal parameter or the preset frequency-domain location; and
wherein the processor is further configured to: transmit a second higher-layer signaling to the terminal in a case that the first trigger signaling is used to trigger the terminal to transmit the uplink reference signal to the network side in the frequency band corresponding to the preset signal parameter for a plurality of times, wherein the second higher-layer signaling carries a frequency hopping rule for transmitting the uplink reference signal to the network side in the frequency band corresponding to the preset signal parameter for a plurality of times; and
wherein the preset signal parameter comprises one signal parameter or a plurality of signal parameters, and in a case that the preset signal parameter comprises a plurality of signal parameters, the signal parameters are the same or different; or the preset frequency-domain location comprises one frequency-domain location or a plurality of frequency-domain locations, and in a case that the preset frequency-domain location comprises a plurality of frequency-domain locations, the frequency-domain locations are the same or different; and
wherein each of the at least two different signal parameters is a subcarrier spacing, and the uplink reference signal is an uplink sounding reference signal.

* * * * *